United States Patent [19]

Kageyama et al.

[11] Patent Number: 4,541,371
[45] Date of Patent: Sep. 17, 1985

[54] TWO CYCLE ENGINE

[75] Inventors: Minoru Kageyama, Hamamatsu; Takeo Hirose, Shizuoka; Tadao Matsui, Shizuoka; Hiroshi Ogino, Shizuoka; Shiro Yoshida, Shizuoka; Takayuki Suzuki, Hamamatsu, all of Japan

[73] Assignee: Suzuki Motor Co., Ltd., Shizuoka, Japan

[21] Appl. No.: 651,706

[22] Filed: Sep. 18, 1984

[30] Foreign Application Priority Data

Sep. 19, 1983 [JP] Japan ............................... 58-172744
Nov. 8, 1983 [JP] Japan ........................... 58-172588[U]
Dec. 28, 1983 [JP] Japan ........................... 58-202755[U]
Jan. 13, 1984 [JP] Japan ............................... 59-3273[U]
Jan. 13, 1984 [JP] Japan ............................... 59-3277[U]

[51] Int. Cl.⁴ .......................... F01N 7/08; F02B 27/04
[52] U.S. Cl. ............................. 123/65 PE; 123/190 A; 60/314
[58] Field of Search ............. 123/65 PE, 65 V, 73 A, 123/190 C, 190 A; 60/314

[56] References Cited

U.S. PATENT DOCUMENTS 1,515,052 11/1924 Johnson ........................ 123/190 A
3,367,311 2/1968 Tenney ................................. 60/314
4,336,864 6/1982 Asaka et al. ........................ 181/241
4,388,894 6/1983 Tanaka et al. .................. 123/65 PE

FOREIGN PATENT DOCUMENTS 2525277 10/1983 France ................................. 60/314
55-132321 9/1980 Japan .
0032036 4/1981 Japan ............................. 123/65 PE
0076224 5/1982 Japan ............................. 123/65 V
447833 5/1936 United Kingdom ................. 60/314

Primary Examiner—Craig R. Feinberg
Assistant Examiner—David A. Okonsky
Attorney, Agent, or Firm—Finnegan, Henderson, Farabow, Garrett & Dunner

[57] ABSTRACT

An improved two cycle engine is disclosed which includes a subchamber which is in communication with the exhaust port with a cylindrical valve rotatably disposed therebetween. A reed valve unit is turnably supported in the inlet port to open and close the latter. The cylindrical valve is operatively connected to the reed valve unit by way of a linkage mechanism. Either of the cylindrical valve and the reed valve unit is actuated by a servomotor and the other one is actuated by the linkage mechanism. The servomotor is controlled with the aid of a control circuit so as to allow the engine to be operated at a predetermined number of revolutions.

28 Claims, 19 Drawing Figures

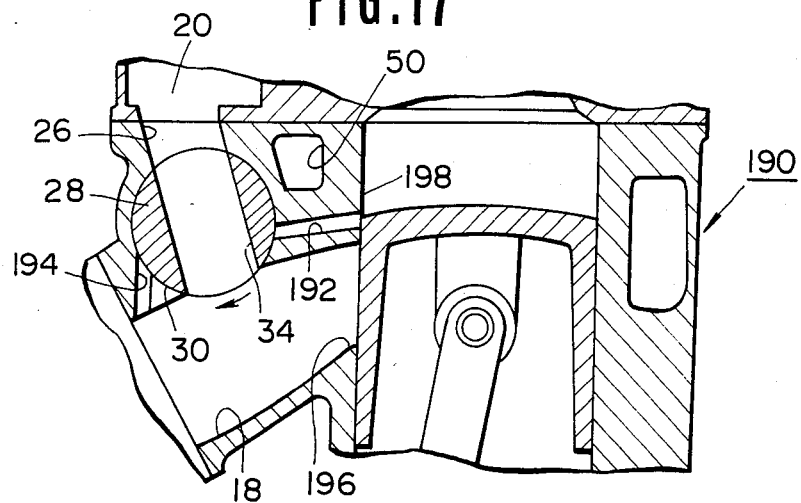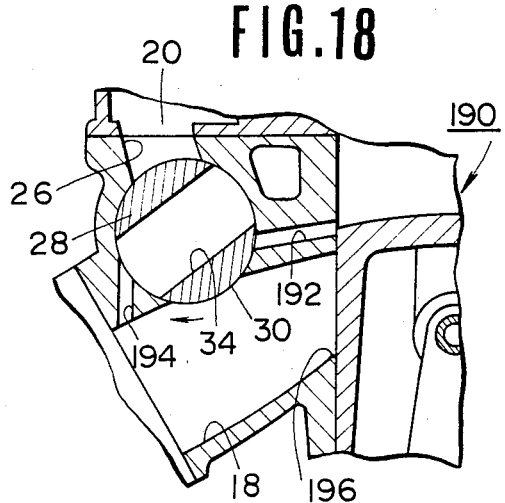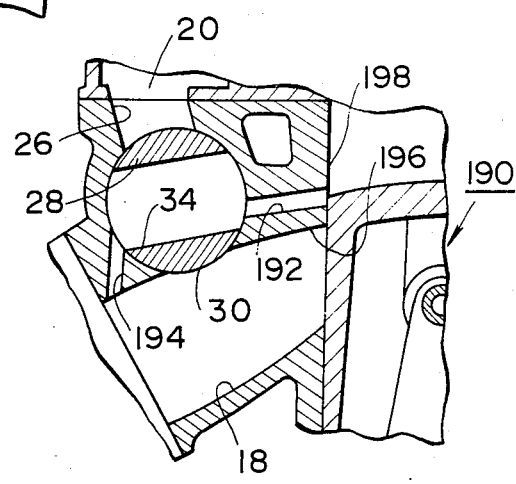

TWO CYCLE ENGINE

BACKGROUND OF THE INVENTION

The present invention relates to a two cycle engine and more particularly to a two cycle engine which includes a subchamber at the exhaust port and a reed valve unit in the inlet port.

As is generally known, increased output from two cycle engine is achieved by increased intake and exhaust efficiencies and increased charging efficiency of intake air. To improve exhaust efficiency there has been hitherto made such an arrangement that two cycle engine has a subchamber disposed at the exhaust port in communication with the latter and a poppet valve adapted to open and close at the same cycle as a predetermined number of revolutions of engine is interposed between the subchamber and the exhaust port. As the poppet valve opens and closes in that way, communication between the subchamber and the exhaust port is alternately established and interrupted so that the optimum volume of exhaust tube is assured in dependence on the existing rotational speed area of engine.

On the other hand, to improve intake efficiency there has been hitherto fixedly arranged a reed valve unit in the inlet port. This reed valve unit is intended to inhibit occurence of backward flowing of combustible mixture toward the inlet port under the influence of movement of a piston after the mixture is sucked into the crank case, that is, occurence of so-called "blow-back phenomenon" so as to improve suction efficiency mainly in the lower rotational speed area.

To meet requirement for improved efficiency the conventional two cycle engine employs a poppet valve adapted to alternately establish and interrupt communication between the exhaust port and the subchamber in the above-described manner. Since the poppet valve is constructed so as to interrupt communication between the exhaust port and the subchamber with the aid of resilient means such as coil spring or the like when engine is rotated at high rotational speed, the poppet valve fails to be brought in tight contact with valve seat in the higher rotational speed area as it resonates due to vibration of engine. Thus, the exhaust port becomes communicated with the subchamber, resulting in reduced output from engine in the higher rotational speed area.

Further, the conventional two cylce engine has a reed valve unit fixedly disposed in the inlet port so that improved intake efficiency is assured in the lower rotational speed area. However, it has been found as a drawback inherent to the conventional engine that as it is operated at higher rotational speed, there takes place resonance due to low natural frequency of vibration of the reed valve unit and thereby timing fluctuates when the reed valve unit opens and closes the inlet port, resulting in reduced intake efficiency in the higher rotational speed area and reduced output from engine.

SUMMARY OF THE INVENTION

Thus, the present invention has been made with the foregoing background in mid.

It is an object of the invention to provide a two cycle engine which assures improved output in the wide working area ranging from lower rotational speed area to higher rotational speed area.

It is other object of the invention to provide a two cycle engine which inhibits reduction of cooling capability.

It is another object of the invention to provide a two cycle engine which assures that a cylindrical valve disposed between the exhaust port and the subchamber functions stably.

It is further another object of the invention to provide a two cycle engine which assures that air venting is effected reliably from the water jacket in the cylinder head.

It is still another object of the invention to provide a two cycle engine which includes a plurality of cylindrical valves arranged side by side which are operatively connected to one another with the reduced number of parts or components required therefor and which are easy to be assembled, maintained and inspected.

It is still further another object of the invention to provide a two cycle engine which can determine a working volume of the subchamber in dependence on output characteristic of engine.

To accomplish the above objects there is proposed in accordance with the present invention a two cycle engine of the early-mentioned type of which improvement consists in that a cylindrical valve is rotatably disposed between the exhaust port and the subchamber and a lead valve unit is turnably supported in the inlet port to open and close the latter. The lead valve unit is operatively connected to the cylindrical valve with the aid of a linkage mechanism so that they are simultaneously actuated by driving means in the predetermined rotational speed are of engine.

Other objects, features and advantages of the invention will become more clearly by reading of the following description which has been prepared in conjunction with the accompanying drawings

BRIEF DESCRIPTION OF THE DRAWINGS

The accompanying drawings will be briefly described below.

FIG. 17 is a fragmental vertical sectional view of a two cycle engine of the invention, particularly illustrating how exhaust bypass ports are arranged on the exhaust port in operative association with the cylindrical valve.

FIG. 18 is a fragmental vertical sectional view of a two cycle engine of the invention, illustrating that the cylindrical valve is rotated to the position for intermediate rotational speed, and FIG. 19 is a fragmental vertical sectional view of a two cycle engine of the invention, illustrating that the cylindrical valve is rotated to the position for higher rotational speed where communication is established between cylinder and exhaust port via the exhaust bypass ports.

It should be noted that same or similar parts or components throughout the drawings are identified by same reference numerals.

DESCRIPTION OF THE PREFERRED EMBODIMENTS

Now, the present invention will be described in a greater detail hereunder with reference to the accompanying drawings which illustrate preferred embodiments thereof.

Figure 1:
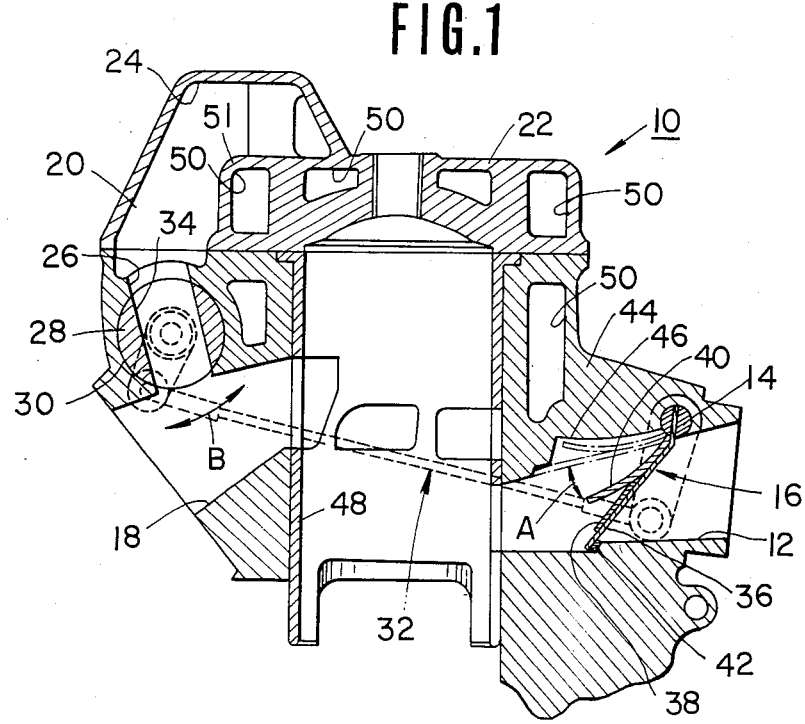
FIG. 1 is a fragmental vertical sectional view of a two cycle engine to which the present invention is applied.

Referring first to FIG. 1, a two cycle engine 10 (hereinafter referred to simply as engine) as illustrated in the drawings is such a type of engine that air intake is achieved by valve means selected from piston reed valve or piston valve. The engine 10 includes an inlet port 12 on which a reed valve unit 16 is supported turnable about a shaft 14. When the reed valve unit 16 is turned in the direction as identified by an arrow mark A in the drawing, the inlet port 12 is closed with the reed valve unit 16 as illustrated by real lines or it is opened without any interference with the latter as illustrated by dotted lines. On the other hand, the engine 10 includes an exhaust port 18 which is in communication with a subchamber 20. This subchamber 20 is substantially constituted by a cavity 24 which is provided on the cylinder head 22 of the engine 10. Further, a cock-shaped cylindrical valve 28 is rotatably supported in a passage 26 extending between the subchamber 20 and the exhaust port 18.

When the cylindrical valve 28 is rotated in the direction as identified by an arrow mark B in the drawing, the passage 26 is opened so that the subchamber 20 is in communication with the exhaust port 18 or it is closed with the cylindrical valve 28 so that the subchamber 20 fails to be in communication with the exhaust passage 18. Incidentally, the cylindrical valve 28 is operatively associated with the reed valve unit 16 by way of a linkage mechanism 32 as illustrated by dotted lines in the drawing whereby actuation of one of the cylindrical valve 28 and the reed valve unit 16 causes the other one to be dependently actuated with the aid of the linkage mechanism 32. As is apparent from FIG. 1, the linkage mechanism 32 is constructed such that when the cylindrical valve 28 assumes the position where the subchamber 24 is in communication with the exhaust port 18 via a passage hole 34 on the cylindrical valve 28, the reed valve unit 16 is caused to close the inlet port 12 and when the cylindrical valve 28 assumes the position where the passage between the subchamber 20 and the exhaust port 18 is closed with the circumferential surface of the cylindrical valve 28, the inlet port 12 is fully opened while the reed valve unit 16 is turned to the position as identified by dotted lines. In FIG. 1 reference numeral 36 designates a reed valve frame, reference numeral 38 does a reed valve, reference numeral 40 does a reed valve stopper, reference numeral 42 does a damper made of elastomeric material such as rubber or the like, said damper being adhesively secured to the lowermost end part of the frame 36 at the right side as seen in the drawing, reference numeral 44 does a cylinder block, reference numeral 46 does a cavity formed on the upper part of the inlet port to receive the reed valve unit 16, reference numeral 48 does a cylinder liner and reference numeral 50 does a water jacket.

Figure 2:
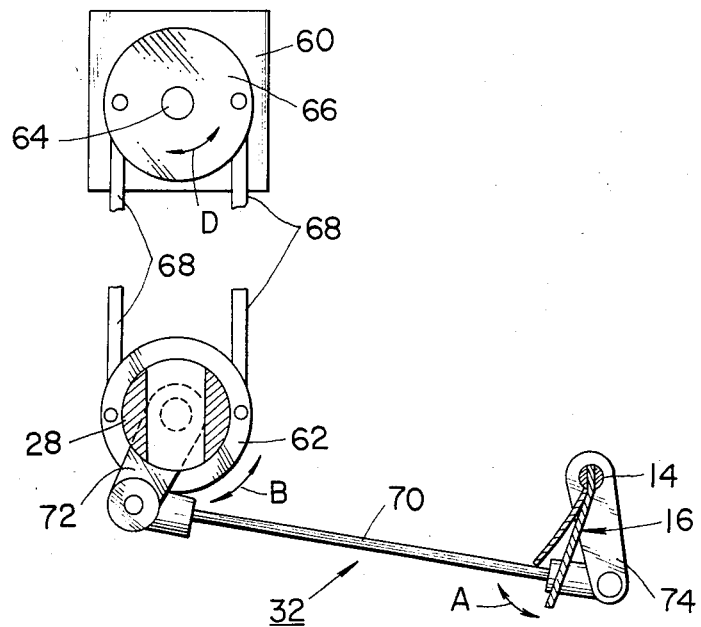
FIG. 2 schematically illustrates a combination of actuating means for both reed valve unit and cylindrical valve and driving means for driving said actuating means.
Figure 3:
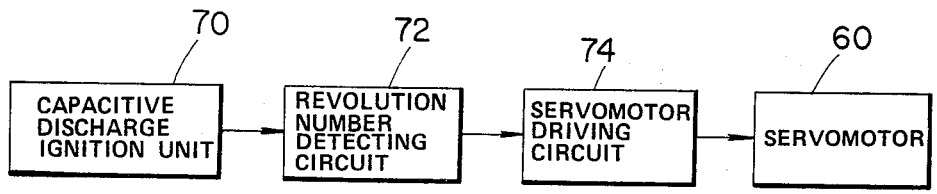
FIG. 3 is a block diagram for the driving means in FIG. 2.

FIG. 2 schematically illustrates arrangement of the reed valve unit 16, the cylindrical valve 28 and a servomotor 60 for actuating the latter, and FIG. 3 is a circuit diagram for the servomotor 60.

As illustrated in FIG. 2, the cylindrical valve 28 is actuated with the aid of the servomotor 60 by way of a pair of wires 68 which are extended between a pulley 66 fixedly mounted of the shaft 64 of the servomotor 60 and a pulley 62 fixedly mounted on the cylindrical valve 28. Thus, as the pulley 66 on the servomotor 60 is rotated in the direction as identified by an arrow mark D, the cylindrical valve 28 is dependently rotated with the aid of a combination of the pulley 66, the wires 68 and the pulley 62 in the direction as identified by an arrow mark B in the drawing. Further, as the cylindrical valve 28 is rotated in the direction as identified by an arrow mark B, the reed valve unit 16 is caused to turn in the direction as identified with an arrow mark A in the drawing by way of the linkage mechanism 32 comprising a rod 70 and arms 72 and 74 pivotally connected to said rod 70. Specifically, when the reed valve unit 16 is turned in the clockwise direction in operative association with the cylindrical valve 28, the passage 26 at the exhaust port 18 is closed with the circumferential surface of the cylindrical valve 28 and the inlet port 12 is opened, whereas when the reed valve unit 16 is turned in the anticlockwise direction as seen in the drawing, the passage 26 is opened and the inlet port 12 is closed. As is apparent from FIG. 2, the one arm 72 is fixedly secured to the cylindrical valve 28, whereas the other arm 74 is fixedly secured to the shaft 14 of the reed valve unit 16.

Next, description will be made below as to the control circuit for the servomotor 60 as well as operation timing of the cylindrical valve 28 and the reed valve unit 16 with reference to FIG. 3.

When the two cycle engine 10 (as illustrated in FIG. 1) starts its operation, the number of pulses outputted from a capacitive discharge ignition unit 70 (hereinafter referred to as CDI unit) is counted by a revolution number detecting circuit 72 whereby the number of revolutions of the engine 10 is detected. It should be noted that an arrangement is made such that a predetermined number of revolutions of the engine is stored in the revolution number detecting circuit 72. Therefore, when the detected number of revolutions of the engine 10 is lowered below the afore-said predetermined one, the revolution number detecting circuit 72 outputs OFF signal to a servomotor driving circuit 74. In response to OFF signal the servomotor driving circuit 74 becomes effective to stop operation of the servomotor 60 whereby the working state as illustrated in FIG. 1 is maintained in which the passage 26 is opened and the inlet port 12 is closed with the reed valve unit. On the other hand, when the detected number of revolutions of the engine 10 exceeds the predetermined one, the revolution number detecting circuit 72 outputs ON signal to the servomotor driving circuit 74. In response to ON signal the servomotor 60 is rotated by a predetermined angle of rotation unit the passage 26 is closed with the circumferential surface of the cylindrical valve 28. When the latter is rotated, the reed valve unit 16 is simultaneously rotated via the linkage mechanism 32 to the position as illustrated by dotted lines in FIG. 1 where the inlet port 12 is fully opened. Then, it is kept immovably at the illustrated position.

Specifically, when the detected number of revolutions of the engine exceeds the predetermined one, the servomotor 60 is driven so that communication between the subchamber 20 and the exhaust port 18 is interrupted and the reed valve unit 16 is displaced to open the inlet port 12.

Next, when the detected number of revolutions of the engine is lowered below the predetermined one again, the revolution number detecting circuit 72 outputs OFF signal to the servomotor driving circuit 74. In response to OFF signal the servomotor 60 is rotated by the predetermined angle of rotation in the reverse direction whereby both the reed valve unit 16 and the cylindrical valve 28 assume the position as illustrated in FIG. 1 and they are then kept immovably in the illustrated position. Thereafter, the same operations as described above are repeated in accordance with difference in number of revolutions with reference to the predetermined one of the engine 10. It should be noted that the predetermined number of revolutions of the engine 10 as described above is determined in the boundary area where it fluctuates from lower to intermediate or higher rotational speed and vice versa.

The above embodiment of the invention as illustrated in FIG. 1 has been described with respect to the case where a combination of cylindrical valve 28 and reed valve unit 16 is employed for a piston valve suction type engine but it should of course be understood that the invention should not be limited to this. Alternatively, the invention may be applied to a piston valve-crank reed valve suction type engine as illustrated in FIG. 4.

Figure 4:
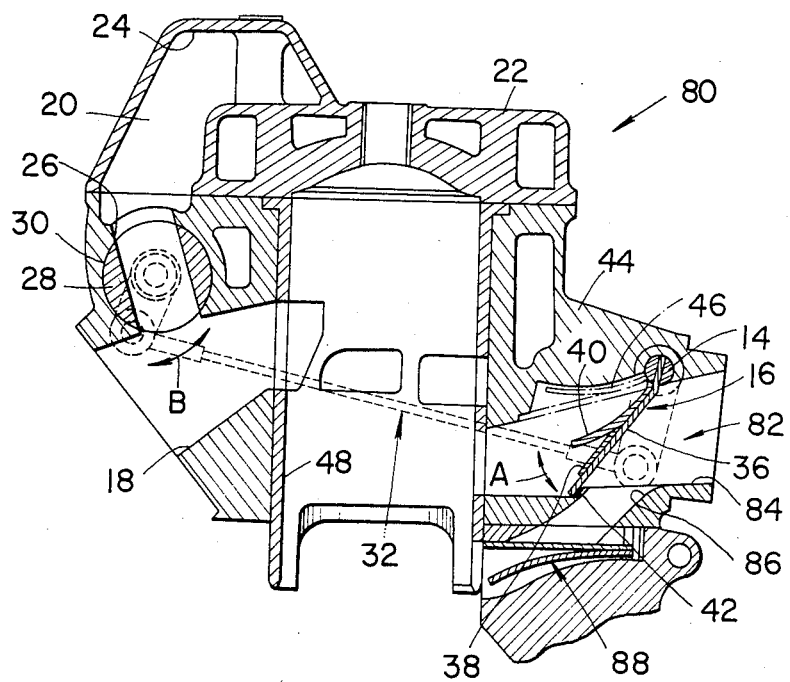
FIG. 4 is a fragmental vertical sectional view of a two cycle engine according to another embodiment of the invention.

In the other embodiment of the invention as illustrated in FIG. 4 the reed valve unit 16 is disposed at the position located downstream of the inlet of a subport 86 which is in communication with the inlet port 82. In the lower rotational speed area the main port 84 and the subport 86 in the inlet port 82 are closed with the reed valve unit 16 and the stationary reed valve unit 88. Thus, in engine in accordance with the other embodiment an occurence of blowing-back of combustible mixture is more effectively inhibited when engine is operated at lower rotational speed, resulting in increased output from engine in the lower rotational speed area assured. It should be noted that in the intermediate or higher rotational speed area engine is operated as a conventional piston valve-crank reed valve type engine because the reed valve unit 16 is displaced the position as identified by chain lines in the drawing. As is apparent from FIG. 4, the reed valve unit 88 is fixedly secured to the subport 86 which is in communication with the inlet port 86.

Figure 5:
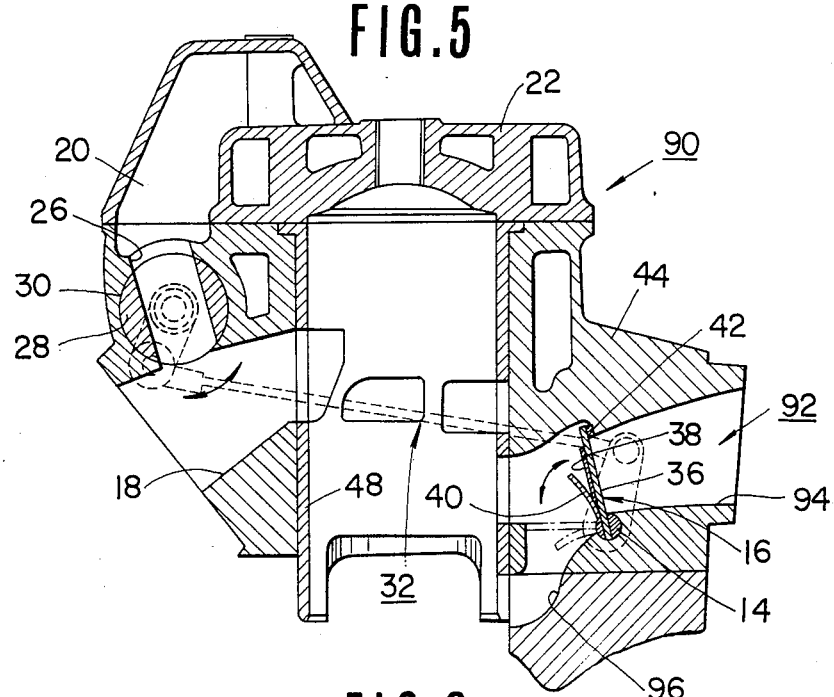
FIG. 5 is a fragmental vertical sectional view of a two cycle engine according to another embodiment of the invention.

The present invention has been described above with respect to the case where it is applied to a piston valve-crank reed valve type two cycle engine but it should of course be understood that it should not be limited only to this. Alternatively, the present invention may be applied to a two cycle engine 90 in accordance with another embodiment as illustrated in FIG. 5. In this embodiment the reed valve unit 16 is arranged so as to close either of the main port 94 and the subport 96 in the inlet port 92 in dependence on the existing rotational speed area of engine. Specifically, arrangement is made such that in the lower rotational speed area the reed valve unit 16 assumes the position as illustrated by real lines in FIG. 5 where it closes the main port 92 in the inlet port 92 and in the intermediate or higher rotational speed area it assumes the position as illustrated by chain lines in FIG. 5 where it closes the subport 96 while the main port 94 is opened. Thus, in the lower rotational speed area engine is operated as a piston crank reed valve suction type engine, whereas in the intermediate or higher rotational speed area it is operated as a piston valve-crank reed valve suction type engine.

In this embodiment the cylindrical valve 28 is operatively associated with the reed valve unit 16 by way of a linkage mechanism 32 but it should be understood that the present invention should not be limited only to this. Alternatively, the cylindrical valve 28 and the reed valve unit 16 may be separately actuated using electrical means such as motor or the like which is adapted to be actuated in response to signal transmitted from a control apparatus.

In each of the above-described embodiments the engine includes a cylindrical valve 28 and a reed valve unit 16 and a servomotor 60 adapted to be electrically controlled with the aid of a control circuit is employed as driving means for rotating the cylindrical valve 28 but it should of cource be understood that the present invention should not be limited only to this. Alternatively, for instance, driving means comprising a solenoid adapted to be actuated in dependence on the number of revolutions of engine, mechanical driving means utilizing centrifugal force, resilient force of spring or the like in dependence on the number of revolutions of engine or the like means may be used. In short, any conventional driving means which serves to drive either of the cylindrical valve 28 and the reed valve unit 16 is dependence on the number of revolutions of engine may be employed for the invention.

Since in a two cycle engine as constructed in the above described manner a cylindrical valve is employed as valve means for opening and closing the passage extending between the subchamber and the exhaust port, there does not easily occur displacement of the cylindrical valve due to vibration. For the reason reliable interruption between the subchamber and the exhaust port is assured when the passage between them is closed with the cylindrical valve. Further, since in a two cycle engine as constructed in the above-described manner a cylindrical valve is operatively associated with a reed valve unit for opening and closing an inlet port by way of a linkage mechanism so that the cylindrical valve and the reed valve unit are actuated with reference to a predetermined number of revolutions of engine, a volume of exhaust pipe and a type of suction can be determined in dependence on the number of revolutions of engine and thereby the optimum suction and exhaust efficiencies are assured for the working area extending from lower to intermediate or higher rotational speed, resulting in increased output achieved over the above-described working area.

In each of the above-described embodiments the subchamber 20 is spaced away from the water jacket 50 with a partition 51 interposed therebetween as typically illustrated in FIG. 1 and thereby heat carried by exhaust gas filled in the subchamber 20 is transmitted to the water jacket 50 via the partition 51, causing the cooling capability of the two cycle engine to be substantially reduced. In view of the foregoing problem the present invention should not be limited only to these embodiments. Alternatively, the present invention may be embodied in such a manner as illustrated in FIG. 6.

Figure 6:
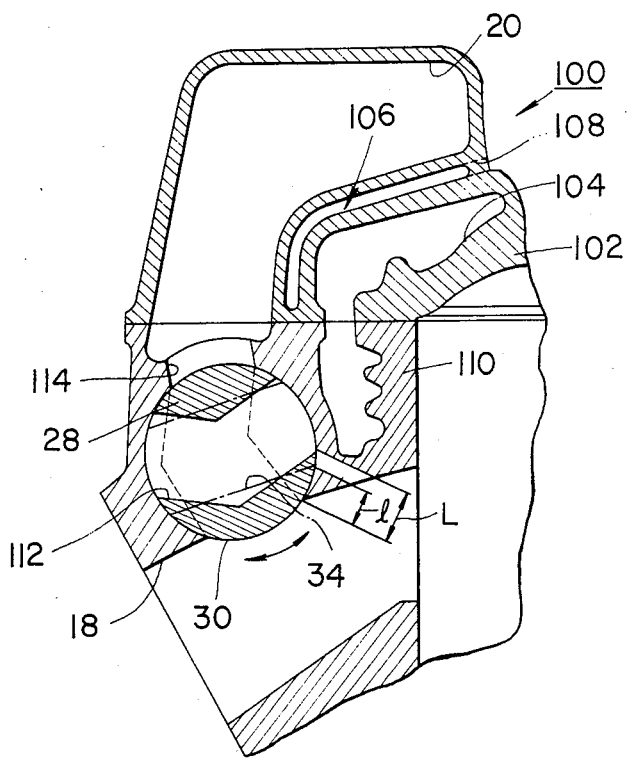
FIG. 6 is a fragmental vertical sectional view of a two cycle engine according to further another embodiment of the invention, particularly illustrating a specific structure between the subchamber and the water jacket.

Same or similar parts or components in FIG. 6 as those in FIG. 1 are represented by same reference numerals.

This two cycle engine 100 (hereinafter referred to simply as engine) includes a subchamber 20 and a water jacket 104 located adjacent to the subchamber 20 on the cylinder head 102 and a chamber 106 is defined therebetween. Further, the cylinder head 102 has a passage 108 formed thereon through which the chamber 106 is in communication with the atmosphere.

Owing to the arrangement made in that way the chamber 106 is always filled with air which flows thereinto from the outside whereby a layer of air in the chamber 106 inhibits heat carried by exhaust gas in the subchamber 20 from being transmitted to the water jacket 104.

As is apparent from the drawing, a combination of passage hole 112 in the cylindrical valve 28 and a passage 114 disposed on the exhaust port 18 of the cylinder block 110 of the engine 100 is bent in the flattened V-shaped cross-sectional configuration. The bent configuration of the passage hole 112 assures that when the passage 114 is closed with the circumferential surface 30 of the cylindrical valve 28, a seal width L is dimensioned longer than a seal width l as identified by a chain line in the drawing corresponding to the passage 34 in FIG. 1 (L>l).

The embodiment of the invention as illustrated in FIG. 6 has been described with respect to the case where the subchamber 20 is made integral with the cylinder head 102 but it should of cource be understood that the present invention should not be limited only to this. Alternatively, it may be embodied such that the subchamber is made separate from the cylinder head and they are assembled together later.

Figure 7:
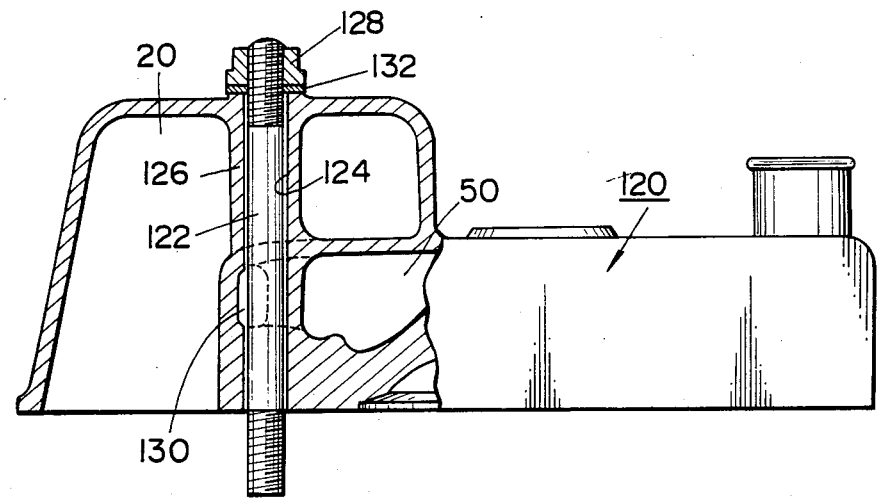
FIG. 7 is a fragmental vertical sectional view of a two cycle engine according to still another embodiment of the invention, particularly illustrating how air venting is effected.

Further, in each of the above-described embodiments the cylinder head of an engine is equipped with an air vent which is constructed as illustrated in FIG. 7.

Same or similar parts or components in FIG. 7 as those in FIG. 1 are represented by same reference numerals.

The subchamber 20 on the cylinder head 120 has a boss 126 which extends therethrough and a stud bolt 122 is inserted through a hole 124 in the boss 126 to be screwed into a threaded hole on the cylinder block. The cylinder head 120 is fixedly mounted on the cylinder block by tightening a nut 128 on the stud bolt 122 which has been inserted through the hole 124.

In the illustrated embodiment air venting means is constituted by a combination of the stud bolt 122, the boss 126 and the nut 128. Specifically, a cutout 130 is formed on a certain part of the hole 124 in the boss 126 so that it is in communication with the water jacket 50. To assure airtightness a gasket 132 is disposed between the cylinder head 120 and the nut 128.

In the illustrated case air venting is effected by way of the steps of loosening the nut 128, forming a clearance between the gasket 132 and the cylinder head 120 and then causing air in the water jacket 50 to be released into the atmosphere via the cutout 130 and the hole 124. After completion of air venting the nut 128 is tightened again until the gasket 132 is brought in airtight contact with the cylinder head 120. Thus, the hole 124 is kept closed.

Figure 8:
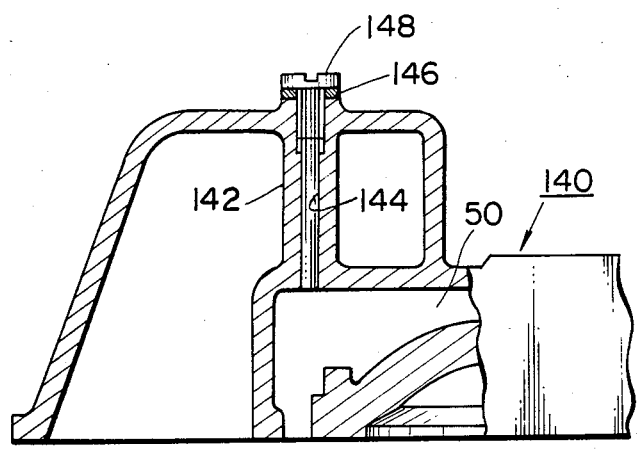
FIG. 8 is a fragmental vertical sectional view of a two cycle engine according to further still another embodiment of the invention, particularly illustrating how air venting is effected in the different manner from tat in FIG. 7.

FIG. 8 illustrates an air vent in accordance with another embodiment of the invention by way of a fragmental vertical sectional view. In the foregoing embodiment air venting is effected by utilizing the hole 124 in the boss 126 through which the stud bolt 122 is inserted for fixedly mounting the cylinder head 120 on the cylinder block. On the other hand, in this embodiment a boss 142 especially for the purpose of air venting is provided in the cylinder head 140 and a hole 144 is formed through the boss 142 so as to allow air staying in the water jacket 50 to be released into the atmosphere therethrough. To close the hole 144 a screw plug 148 is threadably fitted to the upper part of the hole 144 with a gasket 146 interposed between the head portion of the screw plug 148 and the cylinder head 140.

Thus, air in the water jacket 50 on the cylinder head 140 can be vented by loosening the screw stud 148 in the same manner as in the embodiment as illustrated in FIG. 7.

An air vent as constructed in the above-described manner assures that air in the water jacket is vented without fail irrespective of where the subchamber is located at the upper corner of the cylinder head.

In each of the embodiments of the invention as illustrated in FIGS. 1 to 6 the cylindrical valve 28 is provided with sealing means as illustrated in FIGS. 9 to 14.

As is apparent from FIG. 1, this tool structure is intended to inhibit an occurence of leakage of exhaust gas through fine clearance between the inner wall surface of the passage 26 and the circumferential surface of the cylindrical valve 28, that is, to inhibit communication between the subchamber 20 and the exhaust port 18.

The cylindrical valve 28 is fitted with a seal member 150 at both the ends of the passage hole 34, said seal member 150 being disposed on the circumferential surface 30 of the cylindrical valve 28 in such a manner as to fully surround the passage hole 34. Thus, exhaust gas flowing on the circumferential surface 30 of the cylindrical valve 28 in the direction (as identified by arrow marks C and D) is substantially inhibited from entrance into the passage hole 34 by means of the seal member 150. After exhaust gas is inhibited from entrance into the passage hole 34 due to the provision of the seal member 150, it flows further along the periphery of the seal member 150 in the direction (as identified by arrow marks E, F, E' and F') and a part of exhaust gas tends to turn its flowing in the axial direction of the cylindrical valve 28.

Figure 9:
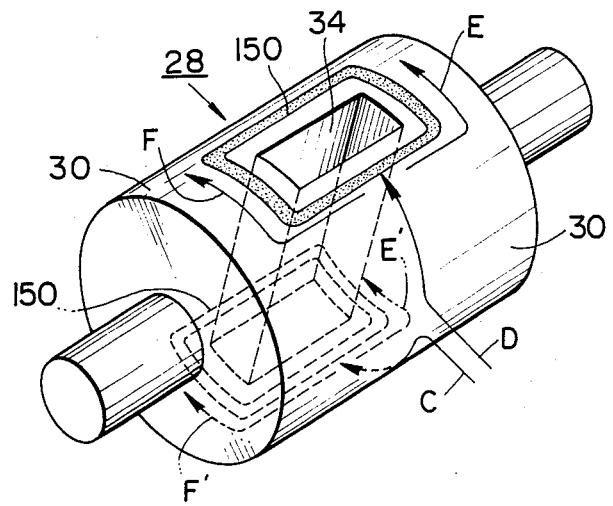
FIG. 9 is a perspective view of a cylindrical valve, particularly illustrating a typical type of sealing means in an enlarged scale.
Figure 10:
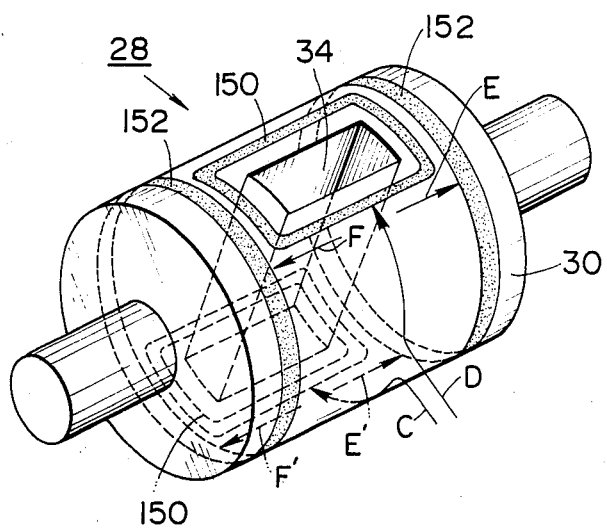
FIG. 10 is a perspective view of a cylindrical valve, particularly illustrating other type of sealing means.

In view of the tendency of axial leakage a pair of annular seal members 152 are arranged on the circumferential surface 30 of the cylindrical valve 28 at the position located in the proximity of both the axial ends of the latter in the spaced relation relative to the seal member 150, as illustrated in FIG. 10 in which same or similar parts as those in FIG. 9 are represented by same reference numerals.

Figure 11:
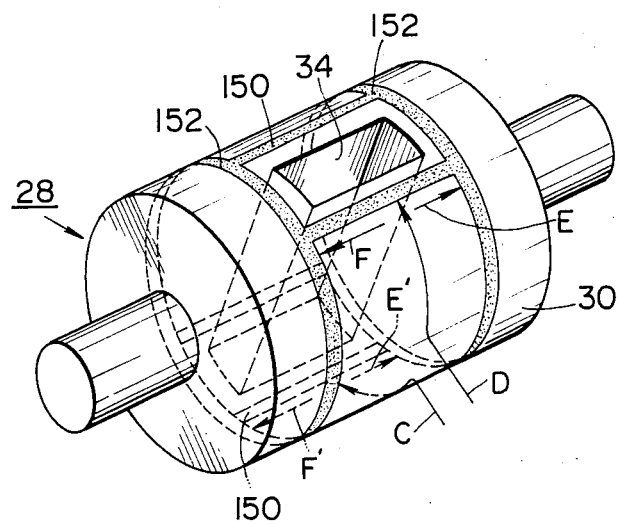
FIG. 11 is a perspective view of a cylindrical value, particularly illustrating another type of sealing means.
Figure 12:
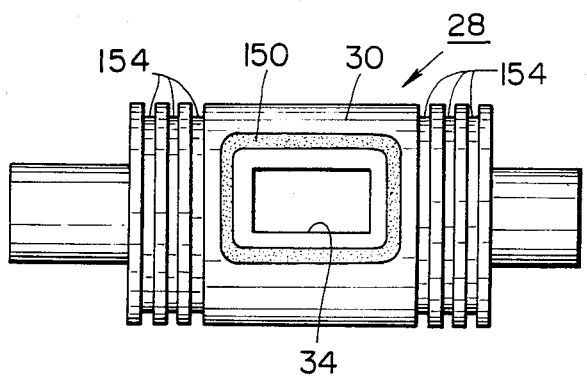
FIG. 12 is a plan view of a cylindrical valve, particularly illustrating another modified type of sealing means.

Alternatively, a pair of annular seal member 152 may be arranged on the circumferential surface 30 of the cylindrical valve 28 at the position located in the proximity of both the axial ends of the latter in such a manner that they are integral with the seal member 150, as illustrated in FIG. 11 in which same or similar parts as those in FIG. 9 are represented by same reference numerals.

Owing to the arrangement of seal members 150 and 152 on the circumferential surface of the cylindrical valve 28 in the above-described manner leakage of exhaust gas into the passage hole 34 as well as in the axial direction of the cylindrical valve 28 (as illustrated by arrow marks C and D) is completely inhibited. Incidentally, the seal members 150 and 152 are made of fiber of synthetic resin (polyfluoroethylene fiber) or in the form of a packing of non-metallic material such as soft rubber or the like or metallic material. Packing may be fixedly secured to the circumferential surface of the cylindrical valve by soldering or coating operation.

Alternatively, the seal packing 150 and 152 as illustrated in FIG. 10 may be replaced with labyrinth packings which are located at the same position.

The circumferential surface 30 of the cylindrical valve 28 is easy to have unburnt engine oil or tar adhesively stuck thereto which causes the cylindrical valve 28 to be inhibited from smooth rotation. To positively prevent an occurence of inhibitive rotation of the cylindrical valve 28 arrangement should be preferably made such that the cylindrical valve 28 is formed with a plurality of annular grooves 154 at both the end parts thereof in order to reduce the working contact area on the circumferential surface of the cylindrical valve 28.

Owing to the arrangement that the cylindrical valve is provided with seal members on the circumferential surface thereof which are disposed to surround a passage hole it is assured that leakage of exhaust gas flowing on the circumferential surface of the cylindrical valve is completely inhibited, resulting in reliable sealing function of the cylindrical valve and prevention of reduction in output generated by two cycle engine.

When a plurality of engine cylinders as illustrated in FIGS. 1 to 6 are arranged side by side, that is, the engine is operated as a multicylinder engine, there is necessity for operatively connecting adjacent cylindrical valves to one another with the aid of connecting means to be described later so as to allow them to be actuated simultaneously.

Figure 13:
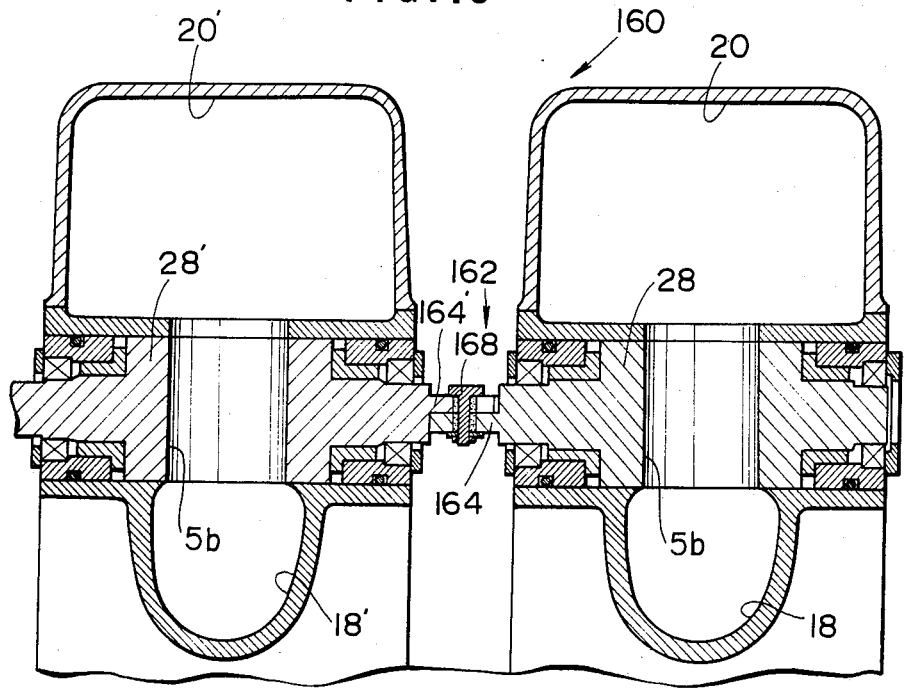
FIG. 13 is a fragmental vertical sectional view of a two cycle engine of the invention, particularly illustrating how the adjacent cylindrical valves are operatively connected together.

FIG. 13 illustrates by way of a vertical sectional view that two engine cylinders are arranged side by side and their cylindrical valves are operatively connected to one another. Same or similar parts or components in FIG. 13 as those in FIG. 1 are represented by same reference numerals.

The illustrated two cycle engine 160 (hereinafter referred to as engine) includes two exhaust ports 18, 18' two subchambers 20, 20' which are in communication with said exhaust ports 18, 18' and two cylindrical valves 28, 28' adapted to establish or interrupt communication between the exhaust ports 18, 18' and the subchambers 20, 20' and a pin joint 162 serves to operatively connect the cylinderical valves 28, 28' together.

Figure 14:
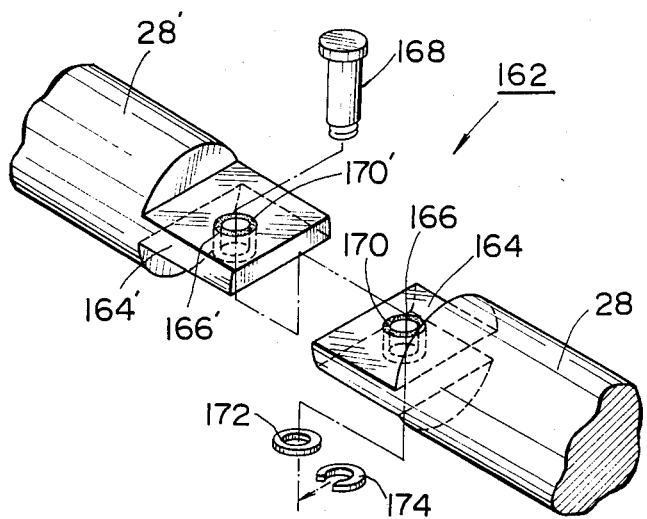
FIG. 14 is a perspective view of the adjacent cylindrical valves, particularly illustrating how their end parts are connected to one another.

As illustrated in FIG. 14 which is a perspective view of parts and components constituting the pin joint 162, the latter comprises tongues 164, 164' formed at the one end parts of the cylindrical valves 28, 28', holes 166, 166' drilled through said tongues 164, 164' and a pin 168 adapted to be inserted through said holes 166, 166'. Elastic pieces 170, 170' are tightly fitted into the holes 166, 166' so that off-center between the adjacent cylindrical valves 28 and 28' can be compensated by geometrical deformation of the elastic pieces 170, 170' when the pin 168 is inserted through the holes 166, 166'. Incidentally, the elastic pieces 170, 170' are firmly held in the holes 166, 166' by thermally adhering cylindrical rubbers to the inner walls of the holes 166, 166' or by press fitting grommets into the holes 166, 166'. Further, in FIG. 14 reference numeral 172 designate a washer and reference numeral 174 does a snap ring which serves to inhibit the joint pin 168 from being disconnected from the holes 166, 166'.

Figure 15:
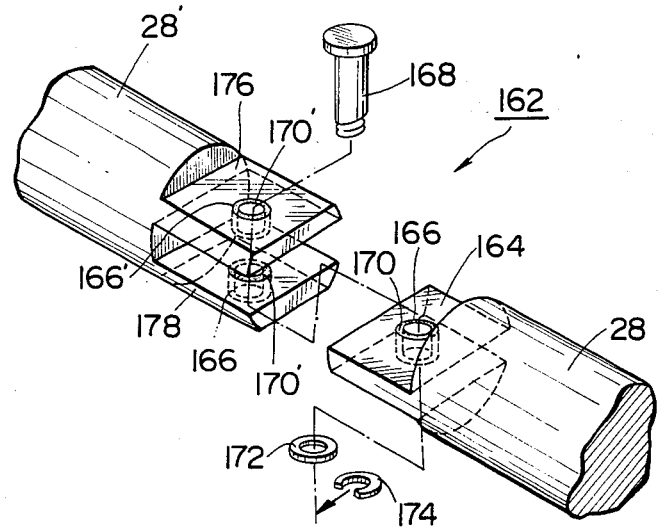
FIG. 15 is a perspective view similar to FIG. 14, illustrating how the end parts of the cylindrical vlaves are connected in the different manner from that in FIG. 14.

In the above-described embodiment both the cylindrical valves 28, 28' are operatively connected together in such a manner that their tongues 164, 164' are superimposed one above another and a single joint pin 168 is extended through them but it should of cource be understood that the present invention should not be limited only to this. Alternatively, the invention may be embodified as illustrated in FIG. 15 in which same or similar parts or components as those in FIG. 14 are represented by same reference numerals. Specifically, the one cylindrical valve 28' has two tongues 176 and 178 formed at its end part in the parallel relation and the other cylinderical valve 28 has a single tongue 164 formed at its end part, said tongue 164 being dimensioned so as to be inserted between the tongues 176 and 178. After the tongue 164 is fitted into the space as defined between the tongues 176 and 178, a joint pin 168 is extended through them. In short, the adjacent cylindrical valves may be operatively connected together in any way, provided that a joint pin is employed for the purpose of operative connection.

In each of the above-described embodiments a pin joint is utilized as connecting means for operatively connecting the adjacent cylindrical valves together to simultaneoulsy actuate them. Thus, operative connection of them can be achieved with the reduced number of parts or components and moreover they are easy to be assembled, maintained and inspected.

Further, in each of the above-described embodiments a subchamber is made integral with a cylinder head. For the reason it is impossible to change a working volume of the subchamber in dependence on output characteristic of two cycle engine. However, the structure of a subchamber as disclosed below will make it possible to easily change a volume of the subchamber in dependence on output characteristic of two cycle engine.

Figure 16:
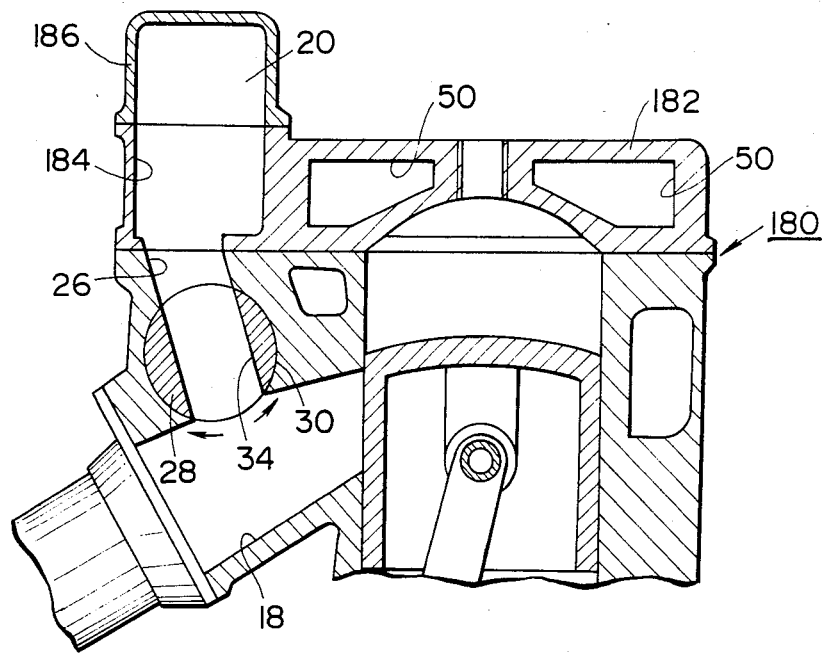
FIG. 16 is a fragmental vertical sectional view of a two cycle engine of the invention, illustrating how the subchamber is designed in the different manner.

Same or similar parts or components in FIG. 16 as those in FIG. 1 are represented by same reference numerals.

In the embodiment of the invention as illustrated in FIG. 16 the subchamber 20 includes a cavity 184 in the cylinder head 182 and a cap 186 mounted on said cavity 184 to close the latter, said cap 186 being fixedly secured to the cylinder head 182 with the aid of tightening means such as bolt or the like (not shown). Thus, it is possible to properly change output characteristic of two cycle engine in dependence on application of the latter by mounting on the cylinder head 182 a cap which is selected from a group of caps having different working volume.

Further, in each of the above-described embodiments a cylindrical valve 28 is disposed between a subchamber 20 and an exhaust port 18 to establish or interrupt communication therebetween in order to improve output of engine 10 in the lower rotational speed area and inhibit reduction of output in the higher rotational speed area. As an improvement relative to these embodiments there are proposed exhaust bypass ports which are formed in operative association with the cylindrical valve 28 as illustrated in FIGS. 17 to 19. This is intended to advance initiation of exhaust timing by a combination of the exhaust bypass ports and the cylindrical valve 28 and thereby improve of output of a two cycle engine.

The same or similar parts or components in FIGS. 17 to 19 as those in FIG. 1 are represented by same reference numerals.

Referring to FIG. 17, a two cycle engine 190 (hereinafter referred to as engine) is formed with exhaust bypass ports 192 and 194 in the proximity of the cylindrical valve 28 at the position located above the exhaust port 18. The one exhaust bypass port 192 is in communication with the cylinder 198 at the position located above an opening 196 of the exhaust port 18, whereas the other exhaust bypass port 194 is in communication with the exhaust port 18.

When the engine 190 is operated in the lower rotational speed area, that is, when the subchamber 20 is in communication with the exhaust port 18 by way of the passage hole 34 in the cylindrical valve 28, both the exhaust bypass ports 192 and 194 are closed with the circumferential surface 30 of the cylindrical valve 28.

When the engine 190 is operated in the intermediate rotational speed area, the cylindrical valve 28 is rotated to the position as illustrated in FIG. 18 with the aid of a combination of actuating means and driving means for driving said actuating means as illustrated in FIGS. 1 and 2. While the cylindrical valve 28 is maintained at this operational position, communication between the one exhaust bypass port 192 and the subchamber 20 as well as between the former and the exhaust port 18 via the passage 34 is interrupted by the circumferential surface 30 of the cylindrical valve 28 whereby a working volume of the exhaust tube suitable for the intermediate rotational speed area is assured.

Further, when the engine 190 is operated in the higher rotational speed area, the cylindrical valve 28 is rotated to the position as illustrated in FIG. 19 with the aid of the actuating means and the driving means as mentioned above. While the cylindrical valve 28 is maintained at this operational position, only communication between the subchamber 20 and the exhaust port 18 via the passage 26 is interrupted by the circumferential surface of the cylindrical valve and communication between the cylinder 198 and the exhaust port 18 via the exhaust bypass ports 192, 194 and the passage hole 34 of the cylindrical valve 28 is established. This causes exhaust timing of the engine 190 to be advanced in the higher rotational speed area, resulting in improved output of the engine 190 in this rotational speed area.

While the present invention has been described above with respect to several preferred embodiments thereof, it should of course be understood that the invention may be embodied in other specific forms without any departure from the spirit or essential characteristics thereof. The above-described embodiments are therefore to be considered in all respect as illustrative and not restrictive and the scope of the invention should be defined by the appended claims rather than the foregoing description. Further, all changes which come within the meaning and the range of equivalency of the claims are therefore intended to be embraced therein.

What is claimed is:

1. A two cycle engine comprising a subchamber which is in communication with an exhaust port by way of a passage, a valve for opening and closing said passage, a reed valve unit for opening and closing an inlet port, actuating means for actuating said reed valve unit and said valve both of which are operatively associated with one another and driving means for driving said actuating means.

2. A two cycle engine as defined in claim 1, wherein said subchamber is composed of a cavity on the cylinder head and a cap gastightly mounted on said cavity.

3. A two cycle engine as defined in claim 1, wherein said exhaust port includes exhaust bypass ports which are formed in the cylinder block at the position located above the exhaust port with the cylindrical valve disposed therebetween, said exhaust bypass ports being operated in such a manner that when the cylindrical valve is rotated to establish communication between the exhaust port and the subchamber, they are closed with it and when it is rotated to interrupt communication between the exhaust port and the subchamber, they are opened to establish communication between the cylinder and the exhaust port or they are closed with it to interrupt communication therebetween.

4. A two cycle engine as defined in claim 1, wherein said reed valve unit is turnably supported in the inlet port to establish communication only with the cylinder.

5. A two cycle engine as defined in claim 1, wherein said reed valve unit is turnably supported in a main port constituting the inlet port which is divided into a main port and a subport, said main port being in communication with the cylinder and said subport being in communication with the crank chamber, and another reed valve unit is fixedly secured to the subport to close the latter.

6. A two cycle engine as defined in claim 1, wherein said reed valve unit is turnably supported in the inlet port which is divided into a main port and a subport in such a manner that when it is turned to close one of them, the other one is opened, said main port being in communication with the cylinder and said subport being in communication with the crank chamber.

7. A two cycle engine as defined in claim 1, wherein said actuating means comprises a linkage mechanism which serves to operatively connect the cylindrical valve to the reed valve unit.

8. A two cycle engine as defined in claim 1, wherein said driving means comprises a servomotor for rotating either of the cylindrical valve and the reed valve unit and a control circuit for controlling operation of said servomotor.

9. A two cycle engine as defined in claim 8, wherein said control circuit comprises a capacitive discharge ignition unit, a revolution number detecting circuit for detecting the number of revolutions of engine and a servomotor driving circuit for controlling operation of the servomotor in response to signal outputted from said revolution number detecting circuit, this revolution number detecting circuit being such that the number of revolutions of engine is detected with reference to signal outputted from said capacitive discharge ignition unit, the detected number of revolutions of engine is compared with a predetermined number of revolutions of engine which is previously stored in the circuit so as to determine whether the former is larger than the latter and the result of determination is then outputted to said servomotor driving circuit.

10. A two cycle engine as defined in claim 1, wherein said subchamber is formed at the position located adjacent to the water jacket in the cylinder head.

11. A two cycle engine as defined in claim 10, wherein the subchamber has a boss extending therethrough, said boss being formed with a hole by way of which the exterior of the subchamber is in communication with the interior of the water jacket, said hole being fitted with an air breathing plug at its upper end.

12. A two cycle engine as defined in claim 10, wherein a chamber constituting a layer of air is formed between the subchamber and the water jacket.

13. A two cycle engine as defined in claim 12, wherein said chamber constituting a layer of air is formed with a hole which is in communication with the atmosphere.

14. A two cycle engine as defined in claim 1, wherein said valve includes a cylindrical valve body which is rotatably held in the passage, said cylindrical valve body being formed with a radially extending passage hole which is opened on the circumferential surface thereof.

15. A two cycle engine as defined in claim 14, wherein it includes a plurality of cylindrical valves each of which is rotatably supported to open and close a passage extending between the subchamber and the exhaust port, the adjacent cylindrical valves being operatively connected together by means of a pin joint which is disposed at their axial end parts.

16. A two cycle engine as defined in claim 15, wherein each of the cylindrical valves is formed with a hole at its axial end part through which a pin constituting the pin joint is inserted, said hole being fitted with a cylindrical elastic piece.

17. A two cycle engine as defined in claim 16, wherein said cylindrical elastic piece comprises a rubber ring.

18. A two cycle engine as defined in claim 16, wherein said cylindrical elastic piece comprises a grommet.

19. A two cycle engine as defined in claim 14, wherein the cylindrical valve is provided with seal members on the circumferential surface thereof which are located so as to surround said passage hole.

20. A two cycle engine as defined in claim 19, wherein said seal member comprises a packing made of metallic material.

21. A two cycle engine as defined in claim 19, wherein the cylindrical valve is provided with a plurality of annular grooves on the circumferential surface at both the end parts thereof.

22. A two cycle engine as defined in claim 19, wherein said seal members are made of non-metallic material.

23. A two cycle engine as defined in claim 22, wherein said seal members are made of fiber of synthetic resin.

24. A two cycle engine as defined in claim 19, wherein the cylindrical valve is further provided with annular seal members on the circumferential surface thereof which are located at the position in proximity of both the ends thereof.

25. A two cycle engine as defined in claim 24, wherein said annular seal members are made of non-metallic material.

26. A two cycle engine as defined in claim 24, wherein said annular seal members are made of fiber of synthetic resin.

27. A two cycle engine as defined in claim 24, wherein said annular seal members are made of metallic material.

28. A two cycle engine as defined in claim 24, wherein the annular seal members in the proximity of both the ends of the cylindrical valve are made integral with the seal members located around the passage hole.

* * * * *